United States Patent [19]
Thompson

[11] Patent Number: 5,326,469
[45] Date of Patent: Jul. 5, 1994

[54] METHOD AND APPARATUS FOR SEPARATING OIL AND WATER

[75] Inventor: Edwin H. Thompson, Norcross, Ga.

[73] Assignee: Zander Filter Systems, Inc., Norcross, Ga.

[21] Appl. No.: 944,534

[22] Filed: Sep. 14, 1992

[51] Int. Cl.$^5$ .............................. C02F 1/78
[52] U.S. Cl. .................. 210/192; 210/195.1; 210/196; 210/197; 210/205; 210/220; 210/259; 210/265; 210/519; 210/539; 210/540; 422/186.12
[58] Field of Search ............ 210/192, 220, 221.2, 210/259, 472, 260, 265, 760, 765, 668, 669, 519, 194, 195.1, 196, 197, 205, 206, 721, 521, 532.1, 536, 540, 613, 617, 631, 539; 422/186.1, 186.12

[56] References Cited

U.S. PATENT DOCUMENTS

| | | | |
|---|---|---|---|
| 745,519 | 12/1903 | Pravicha et al. | 210/513 |
| 2,050,771 | 8/1936 | Wait | 210/192 |
| 2,624,463 | 1/1953 | Freese | 210/519 |
| 2,808,933 | 10/1957 | Mobley | 210/83 |
| 3,680,704 | 8/1972 | Schaefer | 210/170 |
| 3,699,776 | 10/1972 | La Raus | 210/192 |
| 3,756,410 | 9/1973 | Moody et al. | 210/192 |
| 4,028,246 | 6/1977 | Lund et al. | 210/151 |
| 4,198,300 | 4/1980 | Williams | 210/170 |
| 4,233,152 | 11/1980 | Hill et al. | 210/703 |
| 4,251,361 | 2/1981 | Grimsley | 210/703 |
| 4,298,467 | 11/1981 | Gartner et al. | 210/96.1 |
| 4,308,136 | 12/1981 | Warne, Jr. | 210/519 |
| 4,395,337 | 7/1983 | Ciepiela | 210/748 |
| 4,427,426 | 1/1984 | Johnson et al. | 210/192 |
| 4,650,573 | 3/1987 | Nathanson | 210/136 |
| 4,676,908 | 6/1987 | Ciepiela et al. | 210/694 |
| 4,684,467 | 8/1987 | Cloud | 210/519 |
| 4,834,872 | 5/1989 | Overath | 210/221.2 |
| 4,915,823 | 4/1990 | Hall | 210/521 |
| 4,960,513 | 10/1990 | Young | 210/533 |
| 4,980,070 | 12/1990 | Lieberman | 210/522 |
| 5,015,394 | 5/1991 | McEllhenney | 210/760 |
| 5,039,425 | 8/1991 | Caris et al. | 210/691 |
| 5,075,016 | 12/1991 | Barnes | 210/760 |
| 5,116,574 | 5/1992 | Pearson | 210/760 |
| 5,120,435 | 6/1992 | Fink | 210/192 |
| 5,147,534 | 9/1992 | Rymal, Jr. | 210/221.2 |

*Primary Examiner*—Cynthia L. Nessler
*Attorney, Agent, or Firm*—Kennedy & Kennedy

[57] ABSTRACT

Oil and water separation apparatus comprising a reaction chamber having an inlet through which a mixture of oil and water may be introduced. A reaction that extends upwardly from an intake opening therein located in the reaction chamber and out of the chamber. The apparatus also has an ozone generator and a conduit through which ozone may be channeled from the ozone generator into the upwardly extending reaction tube. A pump is provided for pumping water and oil upwardly through the reaction tube entrained with ozone and out of the reaction chamber. A filter is provided for oil oxidized to particulate form by the ozone.

5 Claims, 1 Drawing Sheet

METHOD AND APPARATUS FOR SEPARATING OIL AND WATER

TECHNICAL FIELD

This invention relates generally to methods and apparatuses for separating oil and water, and particularly to methods and apparatuses for separating the oil and water discharge condensate from compressed air systems.

BACKGROUND OF THE INVENTION

Mixtures of oil and water are usually separated by utilizing their differences in specific gravity, advantageously. Since most oils have a specific gravity substantially less than that of water, with time they separate and stratify into a surface layer of oil upon an underlying body of water. Once this occurs the oil may be skimmed off the water. By sequentially treating the residual water in this manner, the oil content of the mixture becomes less and less.

Oil-water separators are used in treating the condensate of compressed air systems. As air is compressed in oil lubricated compressors, part of the lubricating oil becomes entrained in the water condensate discharge. This type of oil is finely dispersed. The specific gravity of some of these oils is quite high, even approaching that of water. Thus, even if the condensate is allowed to settle in holding tanks for hours, such does not guarantee separation by stratification alone.

A commercially available oil-water separator used to separate the oil and water constituents of compressed air systems is the Ecosep series WT separator sold by Zander Filter Systems, Inc. of Norcross, Ga. It has a series of compartments through which oil and water is flowed in series with the liquid being drawn from a lower portion of each compartment and surface oil skimmed away. More specifically with the Zander unit the condensate from air compressors is reduced to atmospheric pressure and passed through a series of settling chambers by liquid displacement. Oil is drawn from the surface of the condensate in each chamber and residual water passed from the bottom of each chamber and then through an activated carbon filter which filters any remaining oil residue.

Though the just described type of oil and water separators have performed effectively, their activated carbon filters have had to be monitored and replaced frequently. This has been attributable to the fact that some of the oils used in air compressor systems tend to remain emulsified and do not rise to the surface of the liquid in the settling chambers. Similarly, other oils with specific gravity approaching that of water rise so slowly that they remain dispersed in the water that is displaced from chamber to chamber.

The just described problem could perhaps be solved with the use of fibrous membrane filters. However, oil and water separators that employ these are structurally complex and very expensive.

Accordingly, it is seen that a need remains for an oil and water separator and separation process that can be used and maintained in a more cost effective manner, and which is particularly well suited for use in processing the condensate from compressed air systems. It is to the provision of such therefore that the present invention is primarily directed.

SUMMARY OF THE INVENTION

In a preferred form of the invention an oil and water separation apparatus comprises a settling chamber into which a mixture of oil and water may be introduced. The settling chamber have a drain at a selected elevation through which surface oil may be drained and a scavenger tube in a lower portion thereof. The apparatus also has a reaction chamber having an inlet in its upper portion coupled with the settling chamber scavenger tube. Means are provided for introducing ozone into the reaction tube for reaction with residual oil unseparated from the water in the settling chamber.

In another preferred form of the invention oil and water separation apparatus comprises a reaction chamber having an inlet through which a mixture of oil and water may be introduced and separated. A reaction tube extends upwardly from an intake opening therein located in the reaction chamber and out of the chamber. An ozone generator is provided and a conduit through which ozone may be channeled from the ozone generator into the upwardly extending reaction tube. Pump means are included for pumping water and oil remaining unseparated in the separation chamber from the reaction chamber upwardly through the reaction tube entrained with ozone.

In yet another form of the invention a method of separating oil and water from a mixture thereof comprises the steps of introducing the mixture into a settling chamber, removing oil from the surface of the mixture in the settling chamber, removing water and residual oil from a lower portion of the settling chamber, and reacting the water and residual oil with ozone.

DESCRIPTION OF THE PREFERRED EMBODIMENT

Figure 1:
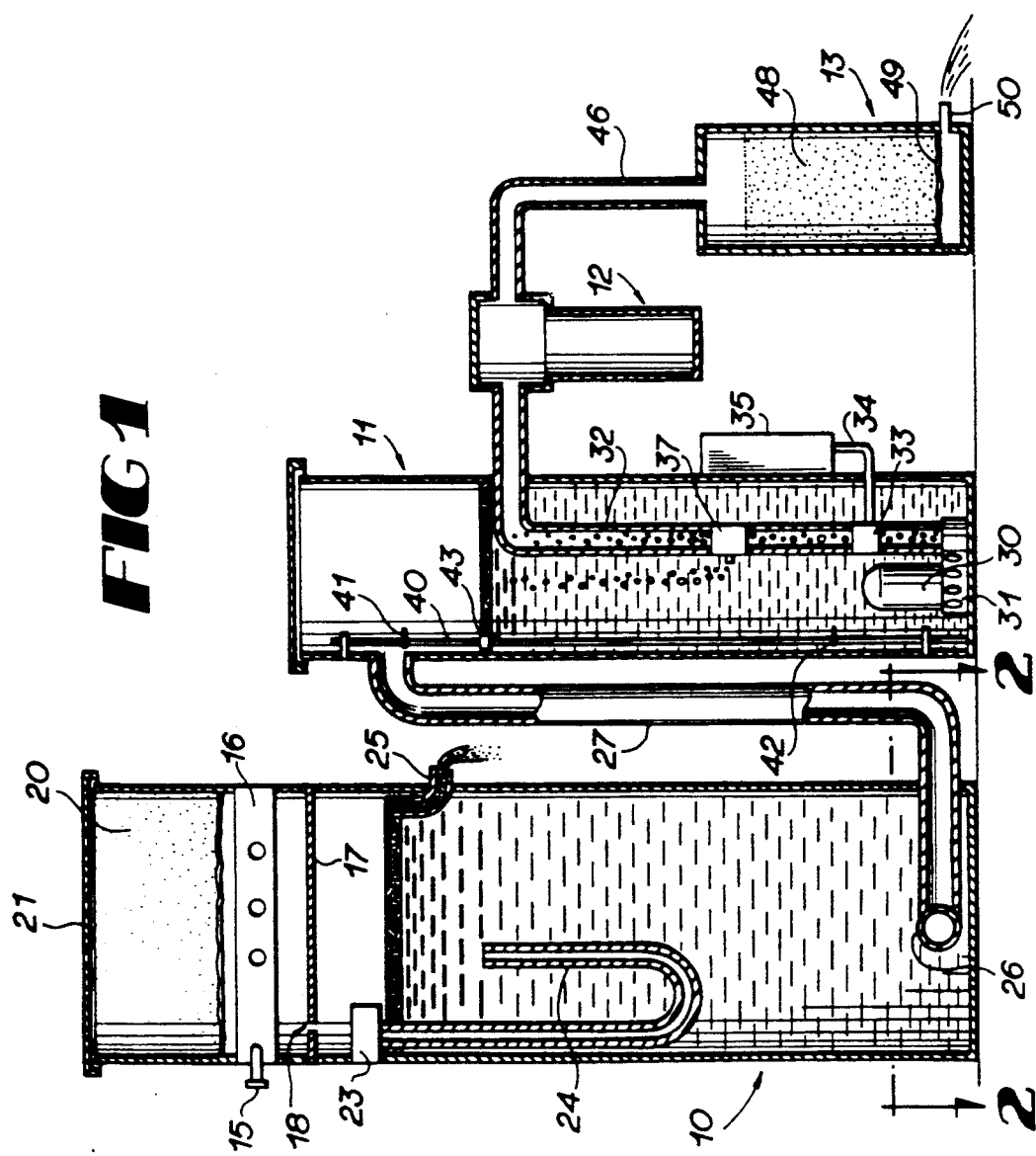
FIG. 1 is a side view, in cross section, of an oil and water separator embodying principles of the invention in a preferred form which may be used in practicing a method of the invention in a preferred form. The liquids in components of the separator are shown at different levels only for clarity of illustration.
Figure 2:
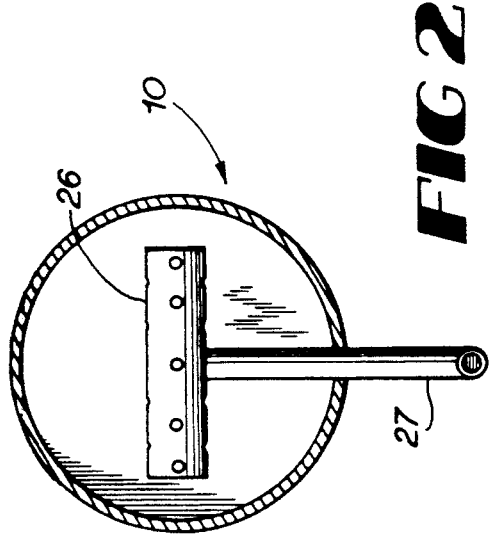
FIG. 2 is a plan view, in cross section, of a lower portion of the settling chamber portion of the separator shown in FIG. 1.

With reference now in more detail to the drawings, there is shown an oil-water separator comprising a settling chamber 10, a reaction chamber 11, a particulate filter 12 and an activated carbon filter 13 as four structurally discrete units. The settling chamber 10 has a condensate intake tubular connector 15 that extends into a collector tube 16 that has a set of side holes and an unshown bottom hole. The collector tube is mounted above a collection plate 17 that has a drain hole 18, and below a bed of activated carbon 20. The bed 20 is supported upon a screen beneath a chamber lid 21 that has a number of small holes therethrough so that the air pressure within the settling chamber is essentially that of ambient air pressure.

The settling chamber 10 also has a funnel 23 mounted beneath drain hole 18, and a generally U-shaped feed tube 24 that depends from the funnel. A drain tube 25 is mounted above the outlet end of the feed tube 24. A scavenger tube 26, having four angularly spaced sets of holes, is mounted adjacent the bottom of the settling chamber 10 from which a conduit 27 extends out of the chamber to a top portion of the reaction chamber 11.

The reaction chamber 11 has a submersible, centrifugal pump 30 mounted on its bottom floor about which a suction screen 31 projects and from which a reaction tube 32 upwardly extends. The reaction tube includes a venturi tube 33 from which an ozone supply tube 34 extends to an ozone generator 35 such as that sold by Ozone Pure Water, Inc., Sarasota, Fla., which is mounted to the outside wall of the reaction chamber. The reaction tube 32 also has a recirculation T joint 37 located above the venturi tube 33.

The reaction chamber further has pump control means for turning on the pump when the level of liquid therein approaches the top of the chamber and for turning it off when the level approaches the bottom of the chamber. This control means includes a slide rod 40 mounted uprightly to the inside wall of the chamber on which an upper switch contact 41 and a lower switch contact 42 are rigidly mounted. A switch actuator float 43 is slidable mounted on the slide rod between the two switch contacts. The two switch contacts are in a conventional circuit that couples the pump 30 and the outlet control valve of the ozone generator 35 with a source of electrical power.

The reaction tube 32 extends out of the reaction chamber to the particulate filter 12. The filter 12 is in turn placed in fluid communication with the activated carbon filter 13 by means of a conduit 46. The activated carbon filter 13 has a bed of activated carbon 48 supported upon a screen 49 above a drain tube 50.

In operation, pressurized condensate from a compressed air system is introduced into collector tube 16 of the settling chamber. Here, its pressure is reduced to atmospheric pressure with the activated carbon 20 preventing condensate from escaping the apparatus to ambience through the holes of the lid 21. The condensate drains from the collection tube onto the collection plate 17 and then through its drain hole 18 into the funnel 23 and feed tube 24. Due to the U-shape configuration of tube 24, the condensate is introduced into the main body of the settling chamber in an upward direction of flow. As the specific gravities of the oils are less than that of water, this direction of entry aids in allowing the oils to raise rapidly to the surface which is shown darkened to indicate a concentrated layer of oil. When the surface of the oil is above the inlet end of the drain tube 25, the oil is drawn from the apparatus.

Flow through the structurally discrete units of the oil-water separator is accomplished by liquid displacement. As a quantity of condensate enters a unit an equivalent quantity is discharged, usually in a non-continuous, batch-like manner. Within the settling chamber 10 a majority of the oil is separated from the water. The cleaner condensate located at the bottom of the chamber is drawn into the scavenger tube 26 and fed to the reaction chamber 11.

Residual oil remaining either mixed with the water or emulsified in it within the reaction tube is now removed by reaction with ozone. In response to the level of liquid within the reaction chamber being sufficiently high to switch on the pump 30 and valve open the ozone generator 35, liquid is pumped upwardly through the reaction tube 32. This causes ozone to be drawn into this flow by the venturi action of the venturi tube 33. Once entrained in this upward flow the ozone oxidizes its oil content causing such to precipitate and to assume the form of solid or semi-solid particulates. The water and particulates are then pumped out of the reaction chamber and into the particulate filter 12. As this occurs some of the ozone and liquid is recirculated back into the main body of the reaction chamber through the T-joint 37 where the ozone can also react with the oil content.

With the residual oils now oxidized and precipitated out of solution and into particulate form, the particulate filter filters the particulates from the stream. The effluent from the filter is then directed onto the bed of activated carbon where final purification of the water occurs prior to discharge from the apparatus through drain tube 50.

With the just described method and apparatus a more efficient cost effective separation of oil and water may be accomplished. With the heavier oils and emulsified oils converted to particulate form, they are substantially removed by the particulate filter rather than by the activated carbon. In this manner the life of the activated carbon is greatly enhanced since its pores do not become clogged with oil. This leaves it free to remove trace impurities and for the particulate filter the task of filtering the oxidized oil precipitates and other impurities. That the apparatus has structurally discrete units also facilitates system monitoring and servicing.

It should be understood that the foregoing describes only the preferred embodiment of the present invention being used to treat the condensate of compressed oil system. The invention however is not limited to this particulate application. Numerous changes and modifications to the apparatus itself may be made without departing from the spirit and scope of the invention as set forth in the following claims.

I claim:

1. Oil and water separation apparatus comprising a settling chamber into which a mixture of oil and water is introduced, said settling chamber having a drain at a selected elevation through which surface oil is drained and a scavenger tube in a lower portion thereof; a reaction chamber having an inlet in an upper portion thereof in fluid communication with said settling chamber scavenger tube; means for introducing ozone into said reaction chamber for reaction with residual oil unseparated from the water in said settling chamber; an upwardly extending reaction tube in said reaction chamber mounted in fluid communication with said ozone introduction means; and a feed back opening located in said reaction tube, said feed back opening defining means for recalculating a portion of said ozone and said mixture of oil and water from said reaction tube back into said reaction chamber.

2. The oil and water separation apparatus of claim 13 wherein said reaction tube has venturi tube in fluid communication with said ozone introduction means said feed back opening is located above said venturi tube, and wherein the apparatus comprises pump means for pumping said mixture of oil and water upwardly through said reaction tube.

3. Oil and water separation apparatus comprising:
a settling chamber having an inlet and an outlet;
a reaction chamber having an inlet located in an upper portion of said reaction chamber through which a mixture of oil and water is introduced;
said settling chamber outlet comprising a scavenger tube providing fluid communication between a lower portion of said settling chamber and said reaction chamber inlet;
a pump means having an intake opening in fluid communication with said reaction chamber;

a reaction tube located in said reaction chamber and having an intake opening, said reaction tube extending upwardly from said reaction tube intake opening, said upwardly extending reaction tube being in fluid communication with said pump means;

ozone generation means;

conduit means for channeling ozone from said ozone generation means into said upwardly extending reaction tube;

means for filtering oil oxidized to particulate form by the ozone, said filtering means being in fluid communication with said reaction tube downstream of said conduit means for channeling ozone;

said pump means defining means for pumping said mixture of water and oil upwardly through said reaction tube containing ozone, out of said reaction chamber and through said filtering means.

4. The oil and water separation apparatus of claim 3 wherein said settling chamber inlet is located in an upper portion thereof, and wherein said settling chamber has an opening to ambient atmosphere in a top portion thereof, and a bed of activated carbon mounted in said settling chamber between said settling chamber inlet and said opening to ambient atmosphere.

5. The oil and water separator of claim 4 wherein said settling chamber has a funnel positioned to collect said mixture of oil and water introduced therein and a generally U-shaped feed tube coupled with said funnel for reversing the direction of flow of said mixture of oil and water collected by said funnel.

* * * * *

UNITED STATES PATENT AND TRADEMARK OFFICE
CERTIFICATE OF CORRECTION

PATENT NO. : 5,326,469
DATED : July 5, 1994
INVENTOR(S) : Edwin H. Thompson

It is certified that error appears in the above-indentified patent and that said Letters Patent is hereby corrected as shown below:

Column 4, claim 1, line 48, change "recalculating" to read--recirculating--;
line 4, claim 2, line 51, change "claim 13" to read
--claim 1--.

Signed and Sealed this

Twentieth Day of September, 1994

Attest:

BRUCE LEHMAN

*Attesting Officer*     *Commissioner of Patents and Trademarks*